UNITED STATES PATENT OFFICE.

HENRY LIVINGSTONE SULMAN AND SAMUEL FIELD, OF LONDON, ENGLAND, ASSIGNORS TO THE METALS EXTRACTION CORPORATION, LIMITED, OF LONDON, ENGLAND.

PURIFICATION OF ZINC SOLUTIONS.

1,341,601.  Specification of Letters Patent.  Patented May 25, 1920.

No Drawing.  Application filed May 12, 1919.  Serial No. 296,552.

*To all whom it may concern:*

Be it known that we, HENRY LIVINGSTONE SULMAN and SAMUEL FIELD, subjects of the King of England, residing in London, England, have invented certain new and useful Improvements in the Purification of Zinc Solutions, of which the following is a specification.

This invention relates to improvements in the purification of zinc solutions, and it refers more particularly to the purification of zinc sulfate solutions obtained by the treatment of zinc ores or zinc-containing materials with sulfuric acid, from which solutions the zinc is subsequently deposited electrolytically.

As is well-known, to obtain a successful deposition of zinc by electrolysis the zinc sulfate liquors must be of a high order of purity; impurities, such as copper, cadmium, iron, antimony, arsenic, nickel and cobalt, must be eliminated or substantially so, as they affect adversely and very seriously the deposition both qualitatively and quantitatively. For example it is desirable that nickel be reduced to a quantity of the order of one-half to one part per million of liquor.

The elimination of iron, copper, cadmium, arsenic and antimony is commonly effected with comparative ease, but it has been found that more difficulty is experienced in the removal of cobalt and nickel, and the present invention relates particularly to the purification of zinc solutions from these metals.

For the removal of copper, cadmium, and similar very electro-negative metallic impurities, tube milling with zinc balls or agitating the solutions with zinc dust is usually found effective, and the methods employed for removing iron also result in the simultaneous removal of arsenic and antimony when present.

It has been generally stated that zinc sulfate liquors may be purified from electro-negative impurities by means of zinc dust. This statement, however, is not of general application. For example cobalt is not removed by zinc dust, and further we find that nickel is not completely removed or to the degree which renders electrolytic zinc deposition economically possible, by zinc dust unless the solutions treated are in a warm condition, as for example at a temperature of from 80° to 100° C.

According to the present invention, therefore, a process for the purification of zinc solutions, such for example as zinc sulfate solutions, from nickel consists in treating the solutions with zinc in a form presenting a large surface, such as zinc fume or blue powder, at a temperature of, for example, from 80° to 100° C.

The zinc employed, such as fume or blue powder, is preferably first washed with acid for the purpose of removing oxid and rendering its action more efficacious.

In carrying the present invention into effect to obtain a pure solution of zinc sulfate from ores or zinc-containing materials for the subsequent electro-deposition of the zinc, the zinc ore or zinc-containing material, roasted if necessary, is treated with the acid liquors from the electrolytic cells in which zinc has been deposited, and from the solution thus obtained any iron, arsenic, antimony, copper and cadmium present are first removed. The solutions are then placed in a vessel having means to stir or agitate them gently, such for example as a paddle, and means to heat them, as for example pipes arranged in the vessel fed with waste steam. It is usually found desirable to provide baffles in the vessel so as to prevent the liquid swirling around without relative motion of the finely divided zinc and the solution. To the solutions is added a quantity of zinc fume which has been previously washed with sulfuric acid, and they are heated to a temperature of from 80° C. to 100° C. and are gently stirred, whereby the nickel present is precipitated, and with it any traces of copper and cadmium which may have remained after the tube milling with zinc balls. An equivalent of zinc passes into solution.

When zinc fume is employed a quantity of about 1 part to 200 parts of liquor usually gives a satisfactory result, and as the nickel is ordinarily present only at the rate of 10 to 20 parts per million of solution, this quantity constitutes a large excess over that theoretically necessary for the removal of the nickel.

The zinc fume can be used several times for the treatment of several batches of impure zinc solutions, small additions of fresh powder or fume being added preferably after the fume has been in contact with the liquor for some time. The partly spent powder removes a proportion of the nickel, while the small addition of fresh powder serves to remove the last traces more rapidly. After a time, however, the zinc, although containing unused metal, becomes ineffective. The zinc may be recovered by weak sulfuric acid, for example a portion of the acid liquors produced in the electrolytic cells, or by other chemical means, and the solution obtained added to the electrolytic circuit, if desired: or the used zinc may be added to the materials ordinarily smelted for the recovery of the metals.

After removal of the nickel the solutions may then be treated for the removal of any cobalt present, as for example by the process described in our co-pending application No. 296,553, filed May 12, 1919 and entitled Improvements in the purification of zinc solutions.

By the process described above zinc liquors containing nickel in an amount sufficient to render the electrolytic extraction of zinc impracticable, are purified to a high degree, the quantity of nickel remaining in solution amounting to one-half part per million or even less.

What we claim as our invention and desire to secure by Letters Patent is:—

1. A process for the purification of zinc solutions from nickel, which consists in treating the solution, freed from iron, arsenic, antimony, copper and cadmium, with finely divided zinc with application of heat.

2. A process for the purification of zinc sulfate solutions from nickel, which consists in treating the solution, freed from iron, arsenic, antimony, copper and cadmium, with finely divided zinc at a temperature of 80° to 100° C.

3. A process for the purification of zinc sulfate solutions from nickel, which consists in treating the solution, freed from iron, arsenic, antimony, copper and cadmium, with zinc fume, at a temperature of 80° to 100° C.

4. In the purification of zinc solutions from nickel by treating the solution with zinc in a form presenting a large surface, after removal of iron, arsenic, antimony, copper and cadmium, washing the zinc with acid to revivify it for re-use.

In testimony whereof we have signed our names to this specification in the presence of two subscribing witnesses.

HENRY LIVINGSTONE SULMAN.
SAMUEL FIELD.

Witnesses:
H. N. RIEDY,
A. W. SHEPHERD.